United States Patent [19]
Warn et al.

[11] Patent Number: 5,394,336
[45] Date of Patent: Feb. 28, 1995

[54] FUEL DISPENSER-CASH REGISTER CONTROL CONSOLE

[75] Inventors: Walter E. Warn, Knightdale; Fred K. Carr, Chapel Hill, both of N.C.

[73] Assignee: Progressive International Electronics, Raleigh, N.C.

[21] Appl. No.: 171,411

[22] Filed: Dec. 22, 1993

[51] Int. Cl.$^6$ .............................................. G06F 15/20
[52] U.S. Cl. ..................... 364/479; 364/405; 364/465
[58] Field of Search ................. 364/479, 465, 131–135, 364/405, 509, 510; 340/825.35; 222/14, 23, 25–28, 36, 37, 52

[56] References Cited
U.S. PATENT DOCUMENTS

| | | | |
|---|---|---|---|
| 4,247,899 | 1/1981 | Schiller et al. | 364/479 X |
| 4,550,859 | 11/1985 | Dow, Jr. et al. | 364/465 X |
| 4,589,069 | 5/1986 | Endo et al. | 364/405 |
| 5,270,943 | 12/1993 | Warn | 364/479 |
| 5,302,811 | 4/1994 | Fukatsu | 364/405 X |

Primary Examiner—Joseph Ruggiero
Attorney, Agent, or Firm—Fred K. Carr

[57] ABSTRACT

A fuel dispenser-cash register control console is provided for simultaneously controlling fuel dispensers and the input key switches on a cash register keyboard so that sales information on each dispensing transaction can be down-loaded to a cash register at the end of the sale. The system includes a control console having a programmable data processor coupled with a read-only-memory ROM chip and read-and-write-memory RAM chip. Commands to the dispensers are initiated through input keys on the console. Sales information is down-loaded to the cash register through a cash register interface board which has a second microprocessor with ROM and RAM, serially connected to the processor in the console. When the register interface processor receives sales information from the console, it locks out the cash register key board, transfers the sales information to the designated department, and then unlocks the keyboard. The system further includes a communication protocol translator for configuring the command logic signals from the console into a communication protocol readable by the dispensers, and the responses from the dispensers into logic signals readable by the microprocessor in the pump controller.

6 Claims, 4 Drawing Sheets

FUEL DISPENSER-CASH REGISTER CONTROL CONSOLE

RELATED PATENTS

U.S. patent entitled "Fuel Pump Control Card" filed Jan. 3, 1992, bearing the U.S. Pat. No. 5,270,943, Walter E. Warn inventor, and U.S. patent application entitled "Port Connectable Pump Controller" filed Jul. 28, 1993, bearing Ser. No. 98,064, Walter E. Warn and Fred K. Carr inventors.

FIELD OF THE INVENTION

The present invention relates to a device and method for controlling fuel dispensers, and more particularly, to a fuel dispenser-cash register control console which controls the dispensers and simultaneously at least one input key switch on a cash register.

BACKGROUND OF THE INVENTION

In the petroleum retail industry, fuel dispensers are often controlled and monitored by a dispenser controller located in a building where other items are available for sale. The dispenser controller has a wire connection to the dispensers for transferring data signals for controlling and monitoring the dispensing process. The controller sends command signals to the dispensers, and the dispensers send response signals to the controller. Commands to the dispensers include price per gallon to be charged for the fuel at each pump, preset limits of fuel to be dispensed, and pump authorization. Responses from the dispensers include pump number, pump status, and dispensed fuel volume and value.

Several U.S. patents including U.S. Pat. Nos. 4,550,859 issued to Dow Jr et al and 4,247,899 issued to Schiller et al relate to control devices for controlling mechanical fuel pumps. Mechanical fuel pumps use a gearing arrangement in the dispenser head to calculate and display the amount and cost of dispensed fuel on a numbered wheel. The dollar amount of the fuel dispensed is displayed on the controller. This information is taken from the controller and keyed into the cash register by an attendant at the site.

U.S. Pat. No. 5,270,943 issued to Walter E. Warn, and assigned to Progressive International Electronics, relates to a fuel pump control card which is a dispenser control device inserted in an expansion slot of a PC for controlling electronic dispensers. Electronic dispensers have a built-in processor for calculating and displaying the volume and dollar value of the fuel dispensed. A microprocessor on the fuel pump control card communicates with the processor in the dispenser for controlling the dispensers. U.S. patent application Ser. No. 98,064 having common inventors and assignee relates to an external dispenser control device which has port connection to a PC or cash register.

In brief, the present invention provides for a fuel dispenser-cash register control console which controls both fuel dispensers and cash register using a common microprocessor. The console is coupled to a cash register through a register interface circuit for down-loading sales information to a department in the cash register at the end of the transaction. There are advantages to automatically ringing up fuel sales at the end of the transaction. When an attendant reads sales information from a control console and transfers it to a cash register, he may mis-key the information of intentionally enter false information. Automatically down-loading sales information from the dispenser controller to the cash register prevents this.

While the present invention uses a similar command structure for controlling the dispensers as disclosed in U.S. Pat. No. 5,270,943, it provides several improvements. Mainly, the present fuel dispenser-cash register control console controls both the dispensers and the cash register. Through a register interface board, sales information is automatically down-loaded to a register when the transaction is paid out by the console. The register interface board locks out the register key board, down-loads the sales information, and then unlocks the key board.

SUMMARY OF THE INVENTION

In summary, the present invention relates to a fuel dispenser -cash register control system for controlling fuel dispensers and simultaneously controlling the input key switches on a cash register keyboard so that sales information on each dispensing transaction can be down-loaded to a cash register at the end of the sale. The system includes a control console having a programmable data processor coupled with a read-only-memory ROM chip and read-and-write-memory RAM chip. The commands for controlling the dispensers during the fueling process are stored in the ROM, and responses from the dispensers during the fueling process are processed and stored in the RAM. Commands to the dispensers are initiated through input keys on the console. Sales information is down-loaded to the cash register through a cash register interface board which has a second microprocessor with ROM and RAM, serially connected to the processor in the console. When the register interface processor receives sales information from the console, it locks out the cash register key board, transfers the sales information to the designated department, and then unlocks the keyboard. The system further includes a communication protocol translator for configuring the command logic signals from the console into a communication protocol readable by the dispensers, and the responses from the dispensers into logic signals readable by the microprocessor in the pump controller.

Accordingly, the primary object of this invention is to provide a dispenser-cash register control console for controlling fuel dispensers.

A further object of this invention is to provide a dispenser-cash register control console which simultaneously controls a cash register system.

A further object of the present invention is to provide a dispenser-cash register control console which is interfaced to a cash register such that when a fueling transaction is completed by the console sales information is transferred to the cash register.

A further object of the present invention is to provide a dispenser control console which stores fuel sales information which can be down-loaded to a printer.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
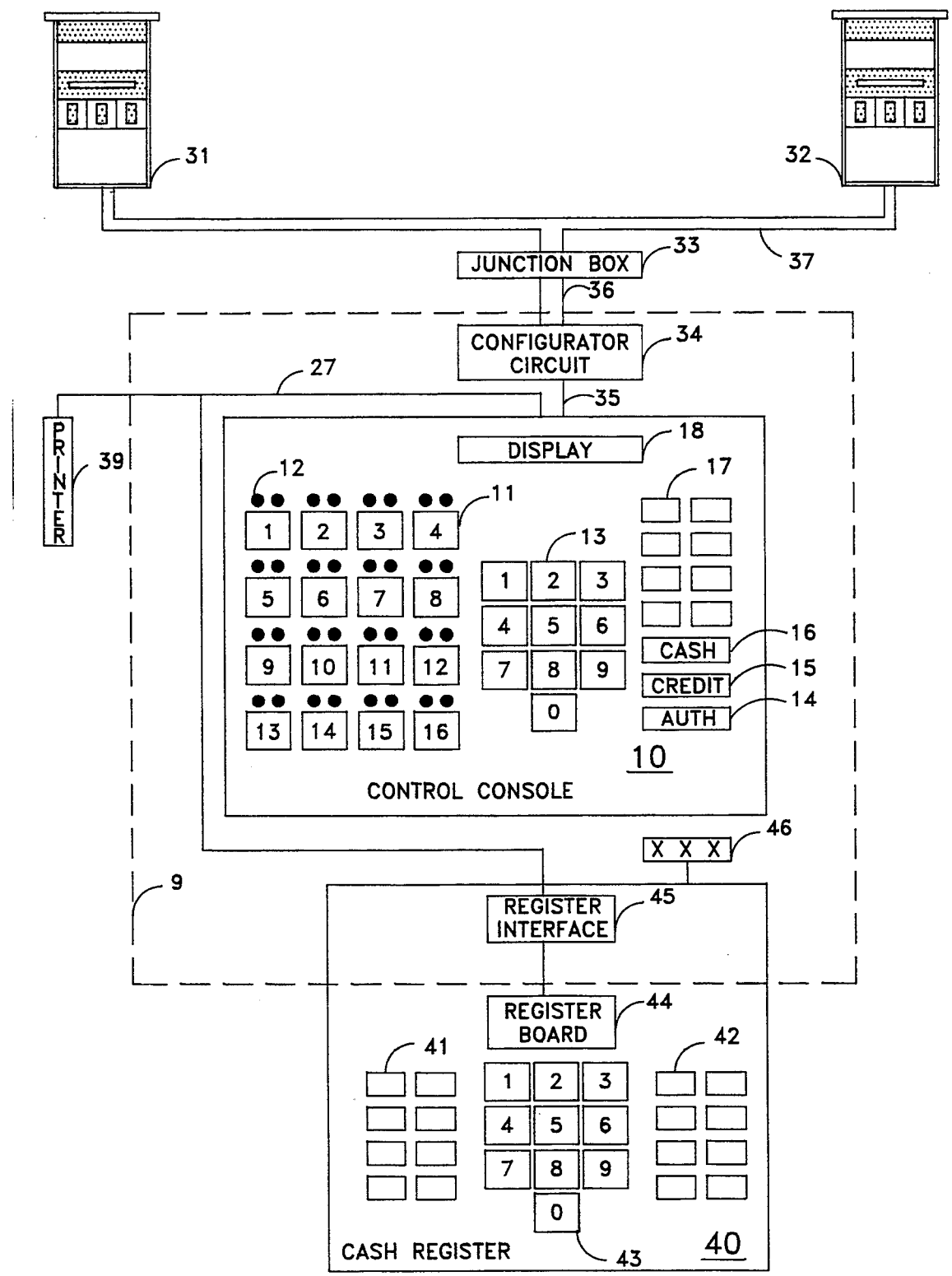
FIG. 1 is a schematic diagram of a fuel dispenser-cash register control console with electrical connections to fuel dispensers and cash register.

Referring now to the drawings, and first to FIG. 1, there is shown a schematic overview of a fueling system which is controlled by a fuel dispenser-cash register control console, generally designated (10). The fuel dispensers (31,32) are electrically connected to the console (10) through a configuration circuit (34) and a pump junction box (33). The console (10) controls the dispensing process at the dispensers (31,32) by sending data signals (commands) to dispensers (31,32), and by the dispensers sending data signals (responses) to the control console (10). The console (10) is connected to the protocol translator circuit, or configuration circuit (34) by cable (35), and the configuration circuit (34) is connected to the pump junction box (33) by cable (36). The pump junction box (33) provides a common electrical connection for all dispensers in the communication loop, which is formed by data wire (37). As later discussed, the configuration circuit (34) configures the communication protocols so that the control console (10) can communicate with the dispensers (31,32). The dispensers may be single product, dual product, or multi-product dispensers.

Fuel dispensers are widely used in the petroleum retail industry to dispense fuel. Generally, a fuel dispenser includes a pump, a flow meter with a pulser, and a fuel supply hose with nozzle. The pump is connected at one end to a fuel supply tank, and at the other end to a flowmeter through a pipe. As fuel is being dispensed, the flowmeter measures the quantity of fuel, and the pulser generates a flow quantity signal from the flowmeter When the nozzle valve is opened, fuel flows through the flowmeter into the fuel supply hose and nozzle into the vehicle tank. The pulser generates a flow quantity signal which is sent to a microprocessor MP in the dispenser head. The dispenser MP is coupled to a read-only-memory chip and a read-and-write-memory for calculating, displaying, and storing in memory information on fuel dispensed. The pump, the flowmeter with pulser, supply hose with nozzle, and MP with ROM and RAM constitute a fuel dispensing means.

The fuel dispenser-cash register control console (10) has a series of input key switches for causing certain events at the dispensers (31,32). There are sixteen pump control keys (11) for selecting a dispenser, the console can control up to sixteen fueling positions or generally eight dispensers. There is a number switch pad (13) for entering information such as preset amounts of fuel to be dispensed, programming modes, and related. There is an authorize key switch (14) for authorizing the dispensers, a cash key (16) and a credit key (15) for completing or paying out a sale. There are console control input keys (17) for entering information such as pump stop, toggle sales, and related. LEDs (12) indicate to the attendant activity at the dispensers, for example, a customer is requesting service, or he has completed fueling. Display (18) displays dispenser information according to the pump control keys (11), for example, the amount of fuel dispensed, a cash or credit sales, and related.

As previously stated, the console (10) sends commands to the dispensers (31,32), and the dispensers send responses to the console. Signals from the console (10) to the dispenser (31,32) include price per gallon to be charged at the dispensers, preset limits for fuel to be dispensed, and pump authorization, an activated mode whereby the pump will dispense fuel when the customer opens a valve in the nozzle. Responses are generated at the dispensers and sent to the pump console including pump number, pump status, and dispensed fuel volume and value for the pump.

During a transaction, a customer pulls his vehicle along side a dispenser. The customer removes the nozzle, and inserts it in his fuel tank. When the nozzle is removed from the dispenser, an LED (12) blinks to indicate to the attendant in the store that a customer wants service. The attendant authorizes the dispenser by pushing the appropriate pump control key (11) and the authorize key (14). As fuel is dispensed, response data is generated at the dispenser and sent to the console (10). When the customer is finished and places the nozzle back on the dispenser, the other LED blinks. The attendant pushes the appropriate pump control key (11) and the cash (16) or credit key (15) for paying out the sale. The volume and value of the fuel dispensed is sent to the console (10) so the customer can pay for the fuel and information on the transaction can be recorded in memory.

When the fueling transaction is paid out by the console (10), information on the transaction is transferred to the cash register, generally designated (40). Cable (27) connects the console (10) and register (40). The console (10) is interfaced to the register (40) through a register interface (45). As later discussed, the console (10) controls the cash register (40) such that sales information is automatically down-loaded. A feature of the present invention is that the console can be interfaced to any number of commercially available register systems. The register interface (45) is installed in these register systems, where the register interface board (45) is connected to the existing register board (44). A cash register typically has a number of departments input keys (41), integer input keys (43) and register function input keys (42). The present invention takes control of the register, and causes the fuel sales to be posted in a department assigned to fuel, and the fuel sale is included with other items which the customer may purchase.

The console (10) stores in memory information on the amount of fuel dispensed. It is programmed to generate and print a number of reports including dispenser totals, shift totals, and station totals. Any number of commercially available printers can be used to print these reports. Dispenser totals are obtained by polling the before discussed processor in the dispenser; shift totals are resetable totals which are reset at each shift change; and station totals are non-resetable totals of fuel dispensed for the station.

Referring further to FIG. 1, there is shown a broken line (9) enclosing three elements of the present invention, including the configuration circuit (34), the control console (10), and the register interface (45). These elements constitute a fuel dispenser-cash register control system means.

A feature of the present console (10) is that it has the ability to control different dispenser brands in the communication protocol unique to the dispenser brand. This is accomplished by the configuration circuit (34) which is in effect a protocol translator circuit. As previously discussed, electronic dispensers have a MP with ROM and RAM for controlling the dispensing process and communicating with the dispenser controller. Certain dispenser brands use current loop communication while others use voltage level communication, while others use a combination thereof. The configuration circuit (34) is, in essence, a circuit for translating communication protocols. With dispensers using current level communication, it is a current translator which uses a optocoupler for translation; with dispensers using voltage level communication, it is a voltage translator which uses a comparator for translation. Reference is made to the above referenced related patent and application for further discussion of the configuration circuit.

Figure 2:
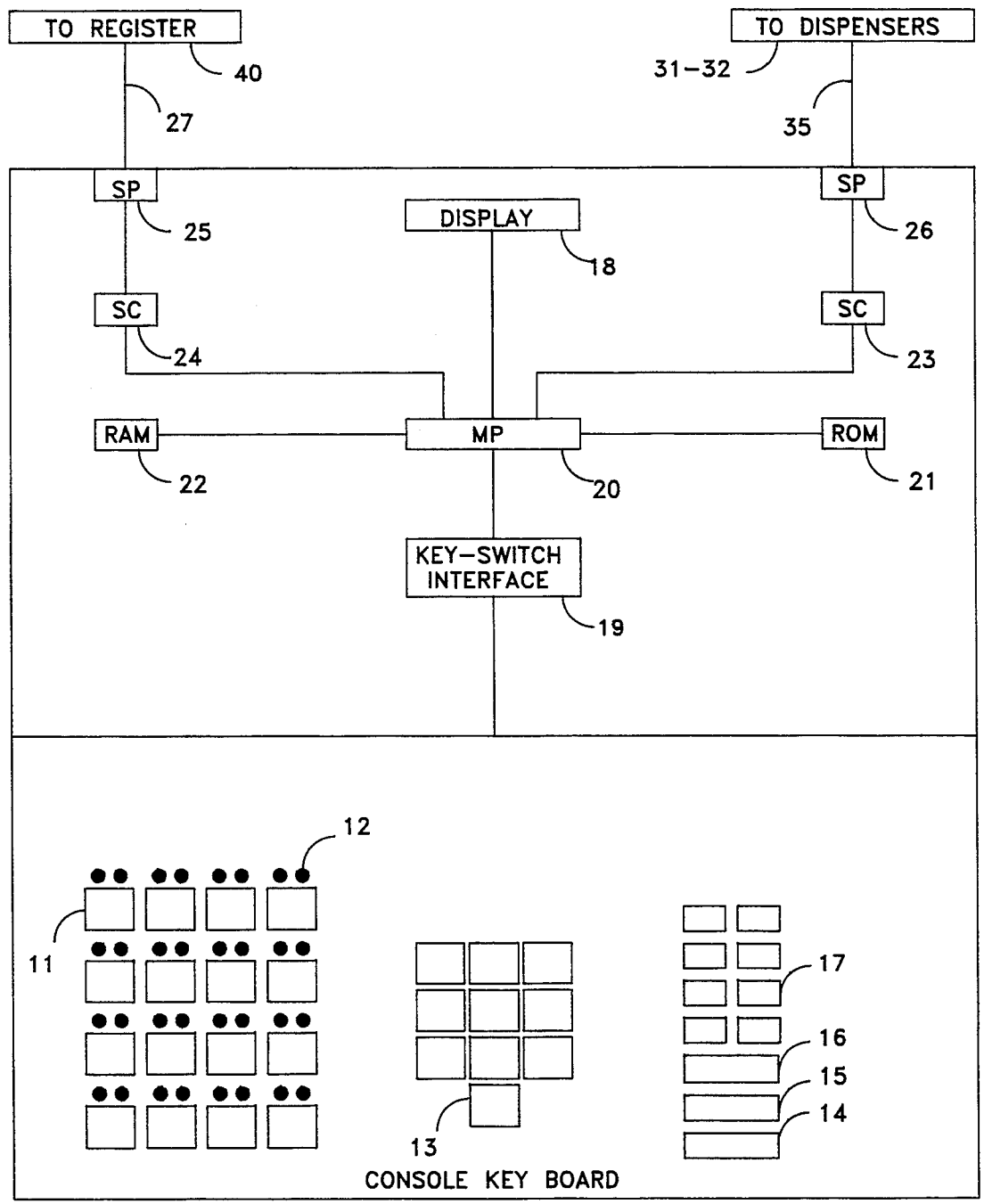
FIG. 2 is a block diagram illustrating the functional components of the dispenser-cash register control console.

Referring now to FIG. 2, there is shown a block diagram of the console (10). The console (10) is connected to the register (40) through a serial port (25) and register cable (27) and to the dispensers (31,32) through a serial port (26) and cable (35). The console includes a microprocessor (20), Zylog Z80 being an example. A feature of the present invention is that the MP (20) controls the dispensers (31,32), down-loads fuel sales information to the cash register (40), and stores in memory information on the dispensing process. A read-only-memory ROM chip (21) stores the dispenser commands, the programming for down-loading sales information to the register (40) at the completion of the sale, and programming for storing fuel report data. A read-and-write-memory RAM chip (22) processes and stores variables such as price to be charged for the fuel at each fueling position, totals dispensed by a dispenser at each fueling position, and pump status. These chips have conventional bus connections with microprocessor (20).

The MP (20) is coupled to a series of input key switches through key switch interface (19) for controlling the dispensers (31,32). There are sixteen pump control key switches (11) for selecting a dispenser to be acted upon. Integer key switches (13) input to MP (20) information such as programing modes, preset limits, and related. Key switches (14-17) provide input to MP (20) instructions such as authorize a dispenser, calculate a sale at cash price, calculate a sale at credit price, and related. In effect, the input key switches cause MP (20) to retrieve certain commands from ROM (21) and in turn control the dispensers accordingly. The microprocessor (20), the ROM (21), the RAM (22), system chips (24) for connection to the register (40), system chips (23) for connection the configuration circuits (34), and the key switch interface (19) with key switches (11-17) constitute a fuel dispenser-cash register control console means.

The fuel dispenser-cash register control console (10) uses a common communication protocol for communicating with different dispenser brands through the configuration circuit (34) which configures the communication protocol to different dispenser brands. Ten commands, with associated responses, are used to control the dispensers during the fueling process including: pump authorization, sale information, pump stop, pump resume, error, status request, reset, pump totals, price per unit, and blend commands. Commands are initiated through key switches (11,14-17) on the console (10). Reference is made to U.S. Pat. No. 5,270,943, having a common assignee and inventor, for further discussion on the command protocol.

Figure 3:
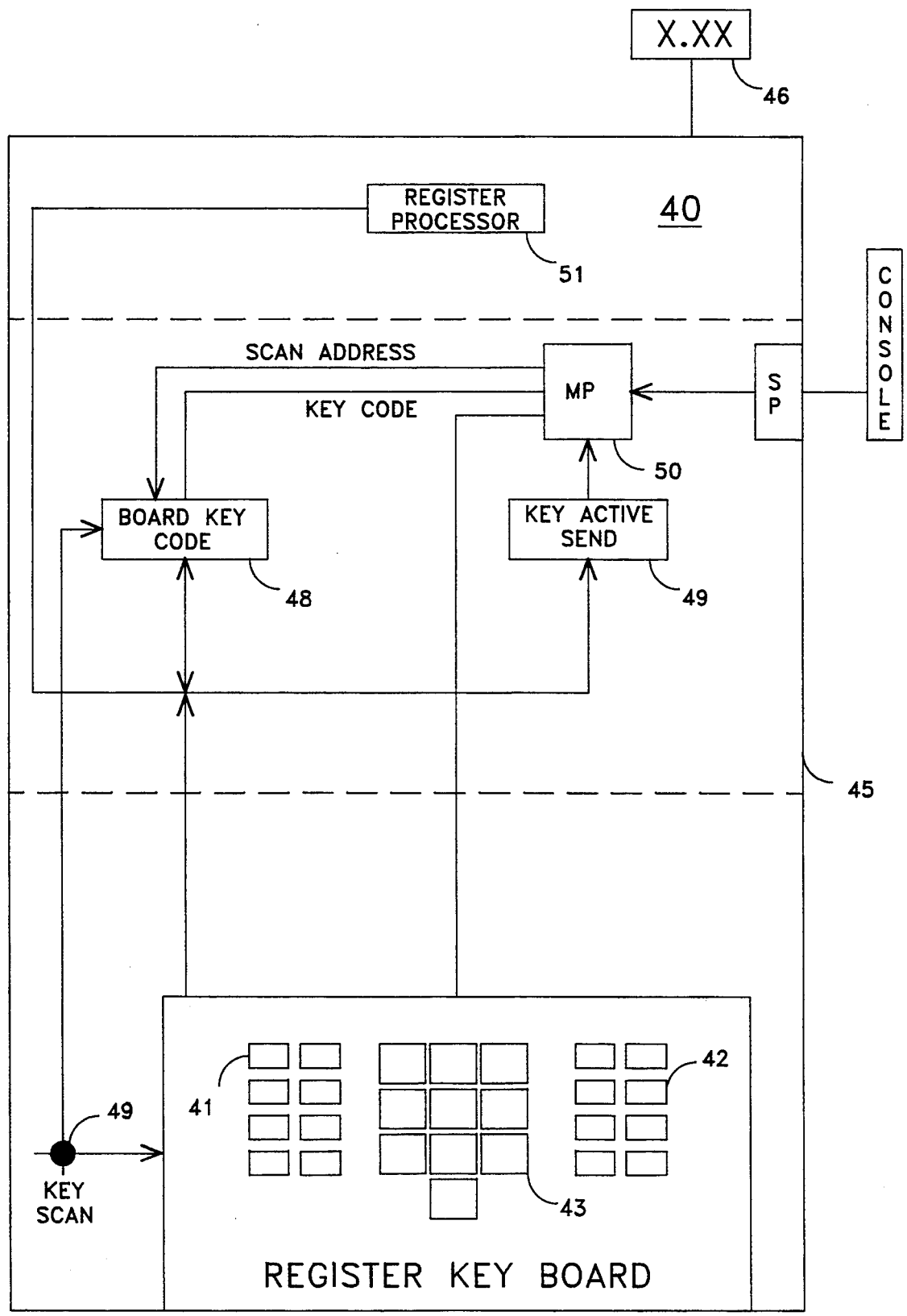
FIG. 3 is a block diagram illustrating the functional components of the console-cash register interface circuit in a cash register.

The present invention improves on the disclosure in U.S. Pat. No. 5,270,943. With the present invention, dispenser control is initiated through key switches on the control console (10), and sales information is down-loaded to a cash register (40) through a register interface (45). Referring now to FIG. 3, there is shown a block diagram of the register interface (45), which is set off by dotted lines. It includes MP (50) with ROM and RAM, and is connected to register board (45) as seen in FIG. 1. When a fueling transaction is complete, the MP (20) in the console (10) down-loads sales information to the MP (50) on the register interface board (45) through serial port (25). The sales information is rung up in a designated department in the cash register (40). During operation, the MP (50) sends a scan address to the board key code chip (48) to scan the key board. If the register key board is idle, it is locked-out. By activating key active chip (49), the sales information is transferred from MP (50) to a designated department through a key code, and in turn to the register processor (51). The key board is then unlocked.

Figure 4:
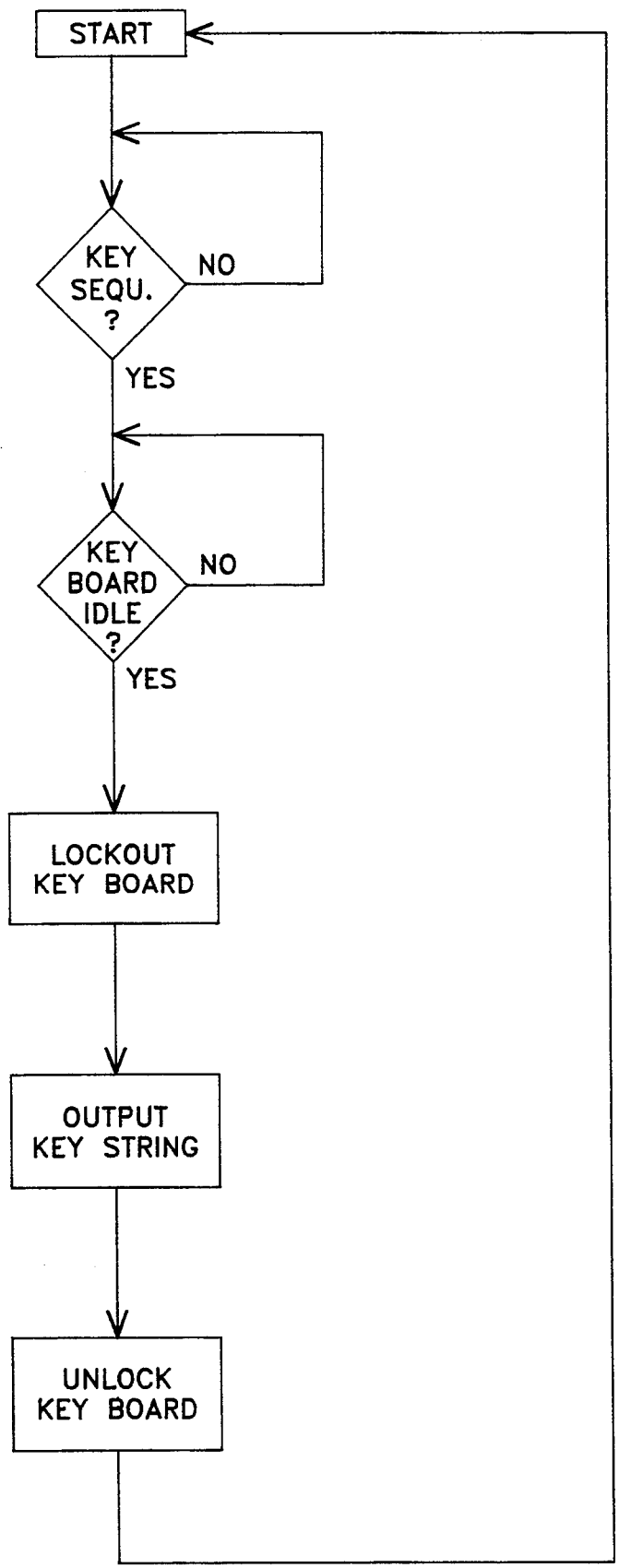
FIG. 4 is a flow chart illustrating the operation of the console-register interface.

Referring now to FIG. 4, there is shown a flow chart for the cash register interface circuit (45) for down-loading sales information to the cash register (40). First, there is a key sequence decision block to check for key sequences. When positive, a key board idle decision block determines if the key board is idle. If so, the key board is locked out and MP (50) outputs the key string to the designated key whereby the sales information is rung up in the designated department. The key board is then unlocked so that the attendant can then key in other transactions.

The present invention may, of course, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fuel dispenser-cash register control system for controlling the dispensing process in at least one fuel dispenser, for controlling at least one department input key switch on a cash register keyboard for transferring information on each dispensing transaction to a cash register at the end of the sale, and for storing in memory totals on the amount of fuel dispensed from said dispenser, comprising:

(a) a control console means having a first programmable data processor coupled with a first read-only-memory device and a first read-and-write-memory device, and a series of console input key switches, for (1) controlling said dispenser from said console input key switches causing said first data processor to retrieve dispenser control commands from said first read-only-memory device in a predetermined sequence and output said commands to said fuel dispenser causing said dispenser to dispense fuel;

(2) receiving dispenser responses from said dispenser during the fueling process and storing said responses in said first read-and-write-memory device;

(3) transferring to said cash register sales information on each dispensing transaction at the completion of the transaction;

(b) a cash register interface means, with serial connection to said first microprocessor in said control console means, having a second microprocessor coupled with a second read-only-memory device and a second read-and-write memory device, for
   (1) receiving from said first microprocessor said sales information on each dispensing transaction at completion of the transaction; and
   (2) controlling said department input key switch on said cash register keyboard such as to post the fueling transaction as a sale in said cash register;
(c) a configuration means with serial connection to said control console means and said fuel dispenser; for
   (1) configuring said dispenser control commands into a communication protocol readable by said fuel dispenser, and
   (2) configuring said dispenser responses into a communication protocol readable by said control console means.

2. A fuel dispenser-cash register control system as defined in claim 1, further comprising a display means for displaying said dispenser responses during the fueling process.

3. A fuel dispenser-cash register control system as defined in claim 1, wherein said configuration means includes an opto-coupler with light emitting diode and transistor for translating current levels.

4. A fuel dispenser-cash register control system as defined in claimed 1, wherein said configuration means includes a comparator for translating voltage levels.

5. A method for controlling the dispensing process in a fuel dispenser delivering fuel to a vehicle by a fuel dispenser-cash register control console means which down-loads sales information on the fuel dispensed from said dispenser to a cash register at completion of the fueling transaction through a register interface means, comprising the steps of:
   (a) setting the price per unit of the fuel to be dispensed by a price command from said console means to said dispenser;
   (b) authorizing said dispenser with an authorization command from said console means allowing said dispenser to dispense fuel;
   (c) polling the status of said fuel dispenser by a status request command from said console means to determine if dispenser is idle, if the nozzle handle has been lifted and service is being requested at dispenser, or if dispenser is dispensing fuel;
   (d) reading sales information at said dispenser by a sales information command from said console means where in turn said dispenser responds with the dollar and volume amount of fuel dispensed;
   (e) down-loading from said console means said sales information to said cash register through said register interface means to said cash register including dollar amount of fuel dispensed; and (f) posting in a designated department said sales information by said cash register as a sale.

6. The method as defined in claim 5, wherein step (e) is practiced by determining if the key board on said cash register is idle, if so locking out said keyboard and in turn outputting a key string including said sales information, after which said key board is unlocked.

* * * * *